Aug. 24, 1937.  E. G. HEDGES  2,091,042
EFFERVESCENT LIQUID DISPENSING DEVICE
Filed Feb. 16, 1935  2 Sheets-Sheet 1
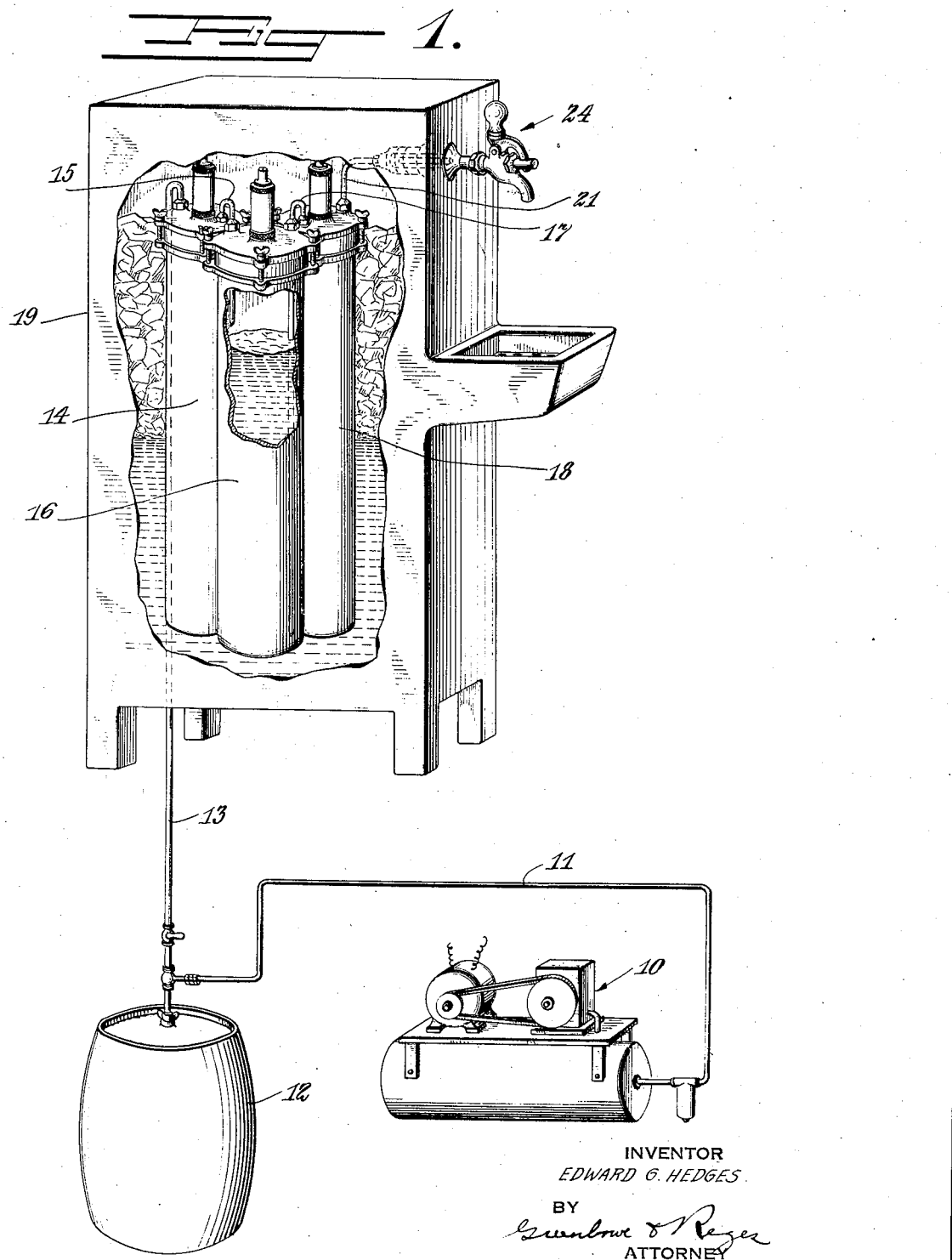
INVENTOR
EDWARD G. HEDGES
BY
ATTORNEY

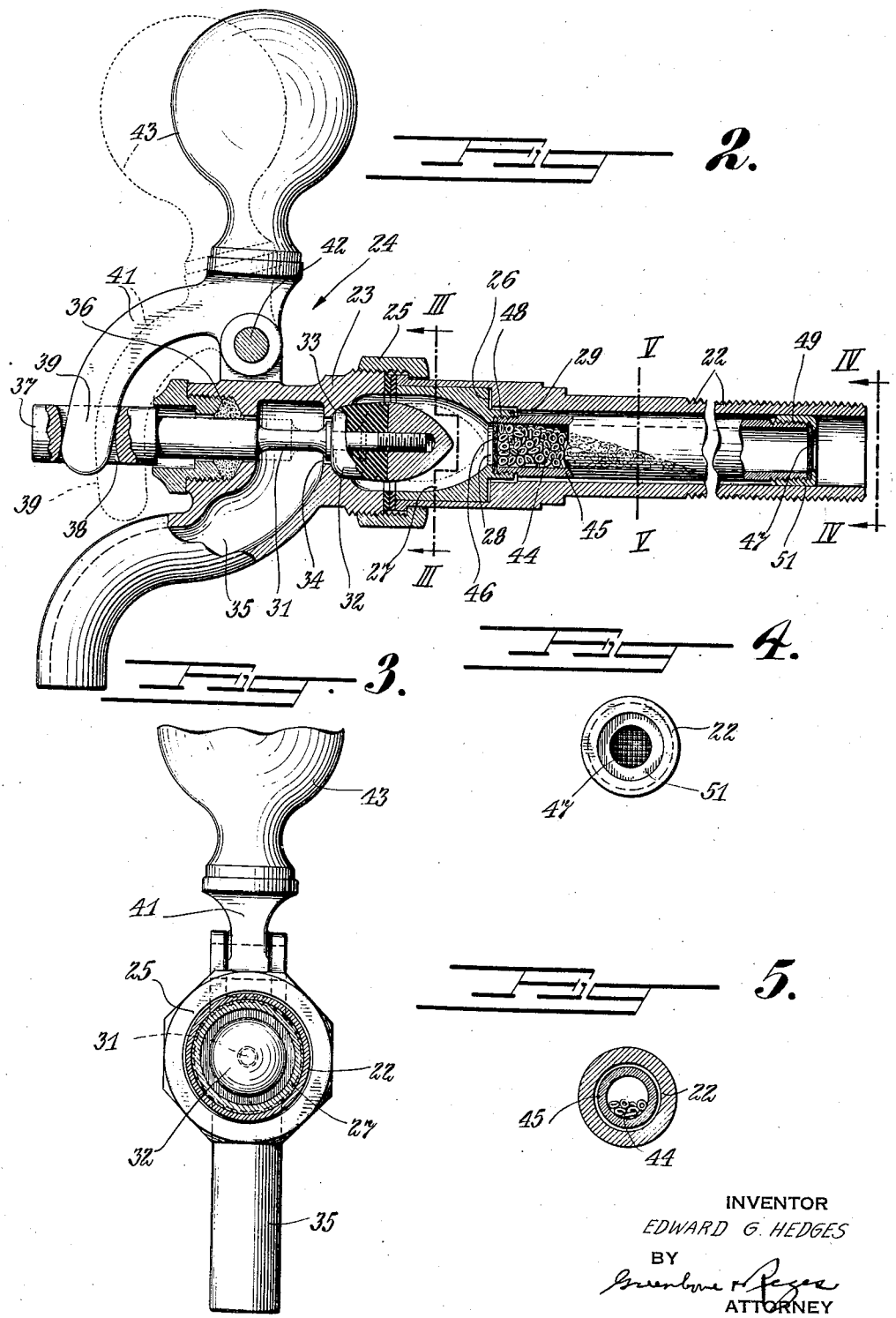

Patented Aug. 24, 1937

2,091,042

UNITED STATES PATENT OFFICE 2,091,042

EFFERVESCENT LIQUID DISPENSING DEVICE

Edward G. Hedges, Newark, N. J.

Application February 16, 1935, Serial No. 6,853

3 Claims. (Cl. 225—5)

This invention relates to a liquid cooling and dispensing apparatus and relates more particularly to an improved system for dispensing gas-containing liquids which are forced through a conduit under pressure.

It is an object of the invention to dispense a gas-containing liquid in substantially its initial condition by so retarding the rate of flow at the outlet that the gases contained in the liquid are not permitted to escape in substantial amounts prior to its leaving the outlet.

Another object of the invention is to dispense a liquid, such for example as beer, in such a manner as to control the texture and amount of froth in the container holding the dispensed beer.

Another object of the invention is to cause a gas-containing liquid to be drawn from a cooling chamber and in transit to the outlet from the cooling chamber retarding the rate of flow by causing the liquid to travel through a plurality of constricted tortuous passages.

Another object of the invention is to force a liquid through a conduit under relatively high pressure to maintain the natural gases in the liquid and to dispense the liquid at a determined volume and rate of speed without appreciable loss of the natural gases.

It is well known that heretofore a certain amount of skill was required in dispensing gas-containing liquids, such as beer. Originally it was the practice to draw beer directly from a keg, that is, the spout or nozzle was connected directly to the barrel or in other cases a short length of pipe was used to conduct the beer from the keg to the counter or bar.

It was known that as the beer was drawn from the keg that the gases escaped and that an excess of free gas in the keg or conduit resulted in a large amount of froth.

It was also the practice to cool the beer in the keg, not only to make it more palatable, but to prevent expansion of the gases and thus to some extent retain them in the liquid. As the beer was drawn from the keg, however, the amount of free gas increased and it became difficult to draw a glass of beer without an excess of froth. As a means of preventing too much froth from reaching the container being filled, it was proposed to provide a section of the conduit, at a point close to the barrel, with a comminuted filling in the form of a quantity of solid particles of metal such as shot. This filling as shown in Patent No. 644,171 issued February 27, 1900 provided what was termed an "anti-froth" device and the idea was to catch or hold back the froth and permit only solid liquid to be discharged. Obviously such device did not prevent froth since as long as the gases were free they would flow though the passages between the shot filling as readily or in fact more freely than the solid liquid, and immediately upon exposure to the air upon escape from the faucet the froth would appear in an excessive quantity.

It was later proposed to place the beer under pressure and instead of cooling the beer in the keg it was cooled during transit to a dispensing faucet at a point remote from the keg.

In accomplishing this a pressure sufficient to maintain the gases in the beer, for example, from 28 to 45 pounds per square inch of surface area, depending upon temperature conditions, was applied to the keg. The beer was conducted from the keg by means of a pipe of a given diameter with a coiled section thereof disposed in a cooling chamber and another section of pipe leading therefrom to the faucet. In the portion of the pipe including the coiled section and the section to the faucet, a pipe of reduced diameter was provided as a throttle passage and then a pipe of a relatively large diameter to serve as an expansion chamber, the latter being connected with the faucet.

This construction is shown in Patent No. 1,289,364 issued December 31, 1918. Certain practical disadvantages attended the use of the apparatus disclosed in the above patent since, whereas an attempt was made to confine the gases, the quick expansion which followed the entrance of the liquid into the expansion chamber resulted in an excessive amount of froth in the container holding the dispensed liquid, together with the movement of the liquid through a long length of pipe.

The present invention is preferably applied to a system which avoids the use of long coils for the flow of the liquid and provides a plurality of cooling containers. The beer in the keg is put under a pressure sufficient to hold in the gases which as is well known is about 28 pounds per square inch at ordinary room temperature with a somewhat higher pressure at higher temperatures.

The beer is led into cooling containers arranged and constructed in any suitable manner, a preferable arrangement whereby good results have been obtained with the present invention is shown in Patent No. 1,985,263 issued December 25, 1934. A relatively short pipe leads from a container to the outlet faucet and between the faucet, in accordance with the present invention, is provided means in the form of a cartridge containing a loose deposit of movable particles, preferably of vitreous material. When the faucet is open the beer under pressure travels through the outlet pipe at relatively high velocity. This pipe is of a relatively small diameter and is of the same diameter throughout its length from the container to the valve chamber of the faucet.

It can be readily understood that the beer being driven through a small diameter pipe would, if released directly to an environment of reduced pressure, be projected at too great a speed for practical purposes, and if first led into an expansion chamber the advantage of the high pressure to keep in the gases would be lost. By providing a barrier of loose particles the pressure is maintained but the rate of flow is reduced. The loose or porous barrier serves to break the solid liquid into a multiplicity of tiny streams which wind their way through the barrier and lose sufficient energy to calm down the flow to a normal or practical rate or a rate of flow desirable to discharge the beer for the filling of receptacles.

The breaking up of the solid liquid is even more effectively accomplished by providing particles of ring-like form, which, when assembled to provide a barrier, furnish numerous tortuous passages. A certain amount of the energy of the flowing liquid is dissipated in moving the particles which settle after each discharge of a quantity of liquid. By reason of the present invention, the great advantage of being able to dispense beer as a solid liquid containing the desired gaseous content and with the desired volume, is made possible.

Further objects and advantages of the invention will be more clearly understood from the following description together with the accompanying drawings, in which Fig. 1 is a perspective view of an apparatus embodying the present invention;

Fig. 2 is an enlarged detail view partly in section showing a nozzle or spout having a cartridge containing loose particles in the path of flow of the liquid;

Fig. 3 is an end view taken on lines III—III in Fig. 2;

Fig. 4 is a view taken on lines IV—IV in Fig. 2 and

Fig. 5 is a view taken on lines V—V in Fig. 2.

The present invention is shown and described as applied to a dispensing system including a compressor 10 which by means of pipe 11 places the beer or other liquid in a keg 12 under a pressure sufficient to hold the beer in what may be considered a solid state, that is, impregnated with the desired gaseous content.

A pipe 13 leads to a container 14 and when this container is filled the beer passes by means of pipe 15 to container 16 and thence by means of pipe 17 to container 18. The containers are disposed in a refrigerator 19 containing a cooling medium such as ice to bring the beer to a desired low temperature. Each of the containers above mentioned is provided with a valve which acts to release the air from the tank as it fills with liquid. After the containers are once filled and a quantity of beer is removed the level in the containers will drop causing an expansion of the gas layer. The valves then act to permit the escape of a sufficient amount of gas to permit the containers to fill up but no air is permitted to enter the containers.

In this manner the desired pressure is maintained and at the same time the pressure is prevented from building up in each container to occupy space to the exclusion of the beer. The above system including the valve construction for accomplishing the above is clearly shown and described in the above mentioned Patent No. 1,985,263.

The present invention may be applied to outlet pipe 21 leading from container 18. It has been found preferable to make the inside diameter of this pipe three eighths of an inch. The outlet pipe leads to a connection 22 having one end threadedly secured to a casing 23 of a valve 24 by a coupling 25. Within the connecter and held by a shoulder 26 thereof is a tubular liner 27 having one end open and the other end provided with an aperture 28 and an internally threaded collar 29.

The liner serves as a chamber to permit movement of a valve stem 31 and is formed to provide smooth flow surface of such curvature as to promote the flow of liquid.

The valve stem 31 is provided with a head 32 which engages a seat 33 surrounding outlet aperture 34 leading to the nozzle or spout 35, the outlet orifice of which is preferably three eighths of an inch in diameter or the same as the inside diameter of pipe 21. The valve is normally held closed by the liquid under pressure which surrounds the head 32. The stem 31 extends across the passage in the spout and beyond the casing 23. A stuffing box 36 is provided to prevent leakage. The extending end 37 of the stem is provided with a slot 38 to receive an end 39 of an arm 41 pivoted at 42 in bearings integral with the casing 24. A hand grip 43 is provided to rock the arm 41 to lift the valve from its seat and cause a discharge of liquid. The position of the arm and its arrangement and proportions are such as to give a uni-directional movement to the stem when moved which gives positive and effective operation.

The contour of the valve head 32, valve seat 33 and the chamber formed by the casing 23 and liner 27 is such as to promote a smooth flow of the beer when the valve is opened, stream-line contouring being utilized to obtain this end. Also the cross-sectional area of this chamber between the valve head 32 and the walls thereof is such that when the valve is in open position it is substantially equal to that of the tubular liner 27, the quantity of beer lying in this chamber being very small when the valve is closed.

Since the beer is forced through the system under a pressure of about 28 pounds per square inch it would be discharged at a greater speed than desired for dispensing into a vessel such as a glass or the like when sold over counters or bars. This speed is reduced by means of a quantity of small particles or beads 44, preferably in the form of rings of vitreous material. This material is contained in a removable tubular holder or cartridge 45 having an inside diameter of about three eighths of an inch. The ends of the holder are closed by mesh covers 46 and 47 of a size mesh sufficiently small to prevent the escape of the beads. One end 48 of the holder is provided with external threads and is screwed into female threads in the liner 27. The other end 49 of the holder is provided with a cap 51 threadedly attached to the holder. The cap 51 may carry the screen 47 so that when the cap is removed the beads may be deposited or removed from the holder for cleansing. The holder being attached to the liner 27 may be removed with the liner when the coupling 25 is manipulated to release the connecter 22. Thus the cartridge may be easily removed at will and one type of beads may be replaced with another type.

It has been found desirable to construct the tubular bead holder of a capacity greater than necessary for the quantity of beads used so that the amount or number of beads used may be varied. As hereinbefore pointed out the assembled beads provide a multiplicity of passageways through which the beer must pass resulting in a change in velocity during a relatively short distance of travel.

In cases where it has been proposed to reduce the diameter of the flow pipe to such degree as to provide sufficient friction to oppose the flow and reduce the velocity, it becomes necessary to provide a section of pipe of such small cross-sectional area or of such length as to be impractical. In cases where the cross-sectional area is sufficiently reduced to slow down the stream the amount of liquid discharged is so small as to make such construction impractical. In the case of longer pipe, the length required is so great as to offer disadvantages in cleaning and in arrangement and further the cost of the system is greatly increased as well as causing considerable agitation of the liquid with a release of the gases contained therein.

It is well known that the velocity of flow at a cross-section of a pipe increases from the walls to the center and with streamline flow the curve of velocities is a parabola and the velocity at the walls is zero. A more effective means of reducing velocity would be to enlarge the pipe but in the case of a liquid containing gas under high pressure the released gas would, as in the case of other systems, cause excessive froth when exposed to the air. It will be understood that the liquid in the entire system is a continuous body under pressure as long as the discharge valve is closed. As soon as this valve is opened the potential energy is released and the liquid is forced out.

In accordance with the present invention the beads are interposed as a barrier and obviously the liquid occupying the space between the valve and the beads as well as the liquid between the beads is under the same pressure. While the valve is closed the beads settle down and the liquid lies in the passages between and through the beads, if the beads are in the form of rings.

When the valve is opened the condition in the line changes and instead of an inactive body a flow occurs. The beads are disturbed and take different positions instantly changing the passageways. Some of the passages may be entirely closed and new ones formed making it necessary for the liquid to find new paths which condition results in a dissipation of energy sufficient to slow down the rate of flow to such degree as to make it possible to draw the beer in a practical and economic manner. When the valve is open the pressure at the outlet orifice is zero so that as the beer is being drawn the pressure is reduced along the line sufficiently to maintain the desired velocity during the flow. Usually a relatively small quantity of beer such as a glassful is taken and the valve closed and with each closure of the valve the beads settle taking new positions.

When providing a cartridge with beads for a given system it is desirable to add or subtract beads until the proper velocity at the outlet orifice is attained since variations in the dimensions of the conduits and the pressure selected may make it necessary to vary the amount of beads in the cartridge.

This is easily accomplished, however, by reason of the removability of the cartridge and if used with a given system the amount of beads for such system may readily be determined and properly charged cartridges supplied.

The present invention provides a means in direct or close communication with the outlet orifice of the system whereby the rate of flow of the liquid is reduced just prior to the point of discharge. In the present structure the point of discharge is taken as the valve orifice, which when the valve is lifted is in direct communication with the atmosphere. The loose particles could, however, be placed in the nozzle on the open or discharge side of the valve. With this arrangement, however, the liquid would not, when the valve is closed, surround the beads. If the particles are in the nozzle and the valve is opened then there will be a slight time interval until the liquid percolates through the beads but the desired volume of liquid and the retarded flow will be attained; however, the disadvantage arises of beer accumulated about the beads souring because of exposure to the air.

In this case when the liquid is flowing the conditions would be the same as when the beads are disposed on the closed side of the valve and the valve is opened. In other words the beads in both cases would be disposed in close proximity or in direct communication with the discharge orifice open to atmospheric air.

Although a cartridge having a filling of beads is shown, it will be evident that other means such as a plurality of walls of mesh material may be used or a metallic fibrous packing of some non-corrosive material may be employed or even a body having large pores such as lava.

The inventive idea lies not in any special form or material but in any means which will arrest the flow by compelling the liquid stream to divide and be retarded in such manner that the amount or volume of liquid discharged will not be appreciably decreased and the pressure held sufficiently high so that the liquid retains its effervescence.

It has been found in practice that the present invention applied to a system as above described makes it possible to draw a glass of beer in such manner that the foam or head is in the form of a layer having a thickness of about one inch of the depth of the glass of the capacity generally employed, this being easily controlled by the amount of beads used in the cartridge. Furthermore, whereas heretofore the froth or foam resulting from drawing a glass of beer had a very coarse texture, that is, the bubbles which constituted the froth were relatively large, the present invention, when employed gives a froth of a fine texture, the bubbles being minute and the character of the foam is noticeably different and does not dissolve and disappear as quickly as the foam when drawn by other methods. It has also been found in practice that a quantity of beer when drawn into an open container by the present method may be left to stand until long after the foam or head has disappeared. This beer which under ordinary conditions would be termed flat may then be repoured into another open container and a new head of foam will appear equal in amount and texture to the head when first drawn and may even be repoured again. Obviously this has its advantages in repouring beer from a pitcher or other large vessel into which the beer is first drawn.

It will be noted from Figs. 1 and 2 that the chamber 27 is so designed as to contain a minimum amount of beer. Also that this is substantially the only section of the faucet that lies outside of the cooling chamber, hence, there is but a small quantity of unchilled beer remaining in the faucet after each dispensing operation. Therefore, since this quantity is small there is very little gas which accumulates in this section of the faucet between intervals of drawing beer from the faucet, hence only an inappreciable amount of foam issues from the faucet when a glass of beer is drawn.

This desirable result is attributed to the fact as above pointed out, that by holding the beer to the gas retaining pressure it has not been pre-expanded to expedite the release of the gases and thus when drawn the gases must slowly work their way out whereby the beer holds its life and desirable characteristics from a consumer's and obviously from a commercial standpoint.

Although the invention has been described and illustrated in connection with a system for dispensing beer including cooling containers, it is obvious that it is applicable to other systems for dispensing beer such for example as that illustrated in the aforesaid Patent No. 1,289,364 or such a system as described in said patent wherein no section of reduced diameter is employed. Where applied to such systems it is essential to regulate the size of the cartridge to provide the necessary retardation of flow of the beer.

What I claim is:

1. The combination with a conduit for conveying brew beverages and having a dispensing faucet at its discharge end, of a device for substantially preventing the formation of foam in the discharge from said faucet, the conduit at said end having a substantially uniform bore, said device including means for defining a space of predetermined volume in said bore, and a quantity of annular members of vitreous material confined in said space, said members having a combined volume materially less than the first-mentioned volume, the annular members being sufficient in quantity to materially restrict the velocity of the beverage as it passes through said predetermined space.

2. In a device as set forth in claim 1, wherein the means for defining the space of predetermined volume comprises a casing, said casing having reticulated end closures permitting flow of beverage therethrough.

3. A device for drawing an effervescent liquid from a source of supply thereof under a pressure sufficient to retain carbonic acid gas therein comprising a conduit of uniform bore, a pair of spaced elements within said conduit for defining a chamber therewithin, a barrier of loose annular particles within said chamber for retarding the rate of flow of said liquid and permitting discharge of liquid therethrough at the stated pressure, the combined volume of said particles being materially less than that of said chamber, said particles being formed of a material of specific gravity greater than that of the liquid but low enough to permit a relatively free movement of the particles by flow of said liquid therebetween in a degree to cause dissipation of energy of the flowing fluid and thereby retard its flow.

EDWARD G. HEDGES.